April 16, 1968 R. W. HILTON 3,377,931
PLANK FOR MODULAR LOAD BEARING SURFACES SUCH
AS AIRCRAFT LANDING MATS
Filed May 26, 1967 4 Sheets-Sheet 1
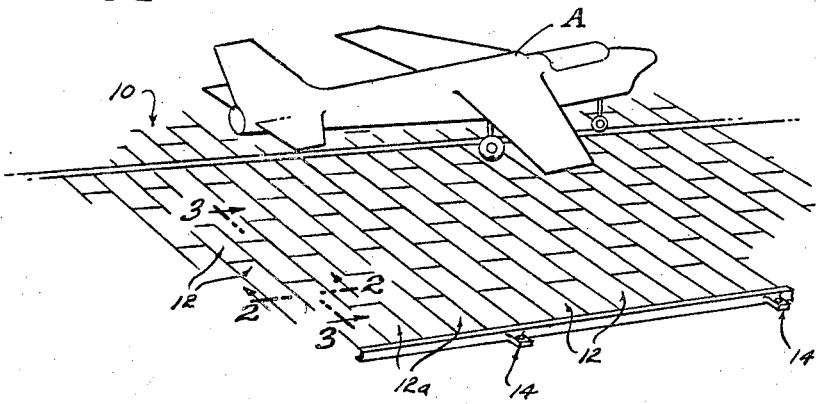
FIG. 1.
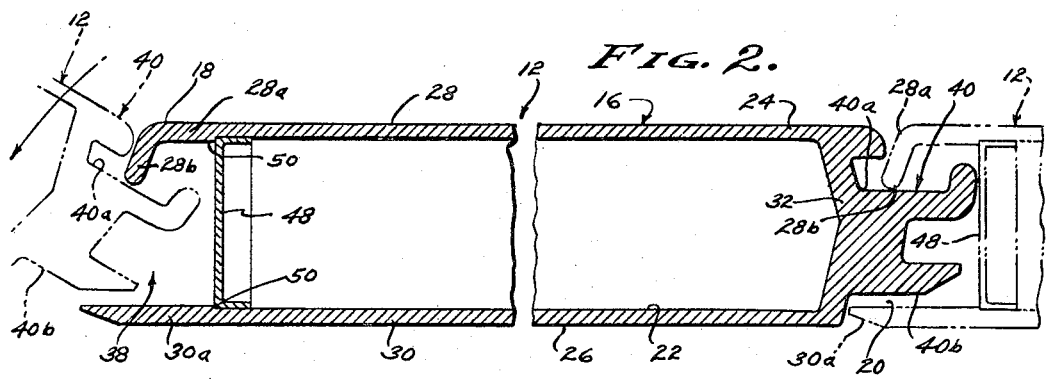
FIG. 2.
FIG. 3.
INVENTOR.
RALPH W. HILTON
BY Donald Townsend
ATTY.

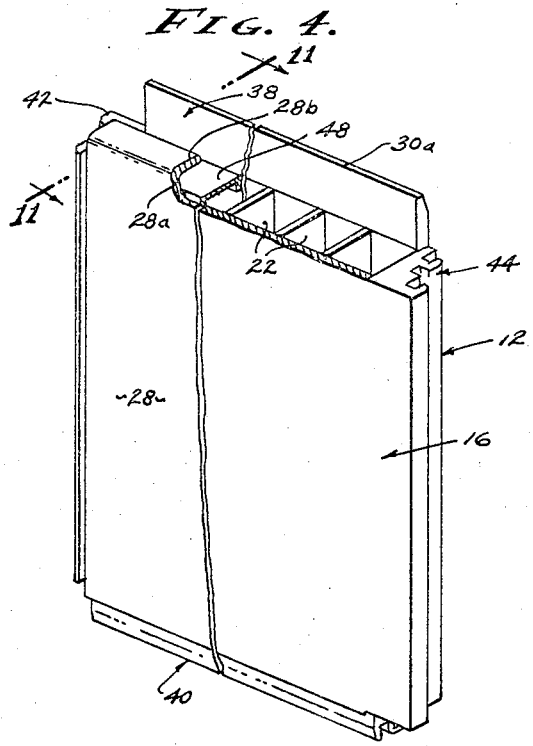
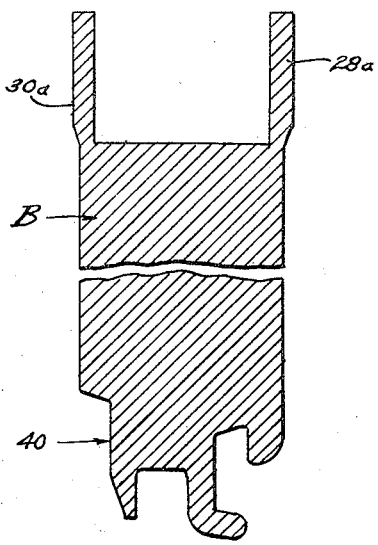
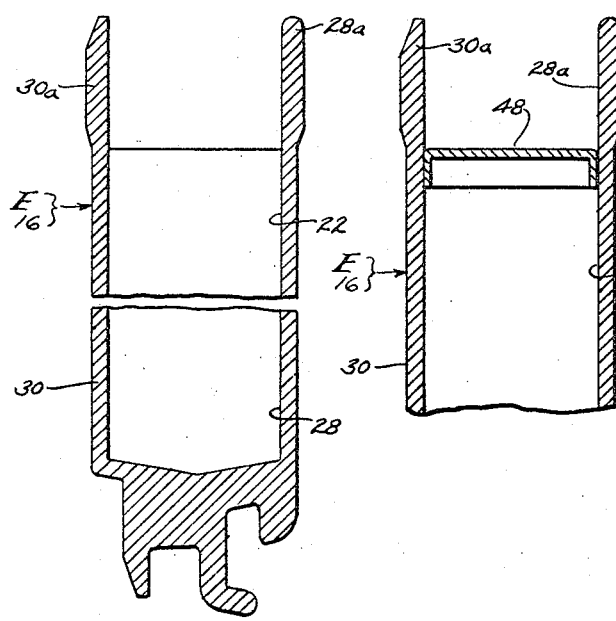
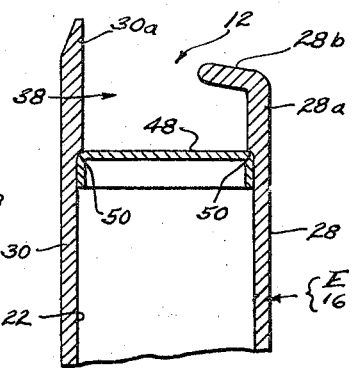

INVENTOR.
RALPH W. HILTON
BY
ATTY.

INVENTOR.
RALPH W. HILTON
BY Wendell Townsend

ATTY.

United States Patent Office 3,377,931
Patented Apr. 16, 1968

3,377,931
PLANK FOR MODULAR LOAD BEARING SURFACES SUCH AS AIRCRAFT LANDING MATS
Ralph W. Hilton, 22934-B Nadine Circle, Torrance, Calif. 90505
Continuation-in-part of application Ser. No. 478,693, Aug. 10, 1965. This application May 26, 1967, Ser. No. 641,699
7 Claims. (Cl. 94—13)

ABSTRACT OF THE DISCLOSURE

This invention relates to extruded structural metal units having deck and base plates spaced by a plurality of parallel ribs extending normal to the longitudinal axis of the unit, with male and complementary female connecting means formed on both the side edges and ends of the unit. The strength of the ribs at their juncture with the deck and base plates is not substantially greater than the strength of ribs at their mid-point, the result being that an applied load is distributed over the ribs surface instead of being concentrated at their mid-point. These units are interconnected with other similar units to form runway matting with the ribs of each unit extending parallel to the normal direction of the traffic pattern.

---

This is a continuation-in-part of U.S. application Ser. No. 478,693, filed Aug. 10, 1965, entitled "Plank for Modular Load Bearing Surfaces Such as Aircraft Landing Mats," now abandoned.

In the detachable interlocking planks employed heretofore, preformed complementary male and female connectors are welded across opposite ends of each structural unit (see U.S. Patent No. 3,172,508). Because of the normally high impact loads applied to these end connectors, they are necessarily of relatively heavy construction and often more rigid than the body of the mat. Where landing aircraft touch down at or near the end of a plank and/or a landing occurs on a section of matting overlying soil sufficiently unstable to support the load, greater elastic deformation can occur in the body of the mat than in the rigid end connector with the development of a shear stress across the weld. With matting in service, the shear stress developed often causes failure of the weld as well as damage to the end of the plank, the exposed sharp or ragged edges of the matting being extremely hazardous to other landing aircraft. To avoid a tire puncture or other mishap, runway matting must consequently be inspected frequently and damaged matting sections either rewelded or entirely replaced.

Further, in the conventional construction of airfield runways, interlocking planks having ribs extending between their ends are laid end-to-end with the ribs extending perpendicular to the direction of landing aircraft. As the wheels of landing aircraft roll across these planks severe bending stresses are applied to and transmitted through the ribs. In the planks employed heretofore, the large fillet formed at the juncture between the ribs and plates prevents flexture; consequently, the bending stresses are concentrated in the ribs at their mid-point. Under normal landing conditions, the high impact loading and repeatedly applied stresses often cause rupture of the ribs at their mid-point. Since such ruptures cannot be detected by visual inspection, the next landing aircraft on that mat section can cause complete collapse of that section and damaged to the aircraft.

It is, therefore, a principal object of the invention to provide an improved and more reliable matting assembled from a plurality of planks having integrally formed end and side edge connectors;

Another object is to provide a durable, high strength airfield matting having ribs extending normal to the longitudinal axis of the planks and parallel to the direction of landing aircraft;

Still another object is to provide a more durable airfield matting capable of sustaining repeated impact loads and bending stresses in the ribs without failure thereof.

These and other objects and advantages of the invention will become apparent upon reference to the following description, drawings, and claims appended hereto.

To attain the foregoing objects, an elongated mat section or plank having deck and base plate elements spaced by a plurality of ribs is provided with end and side edge connectors formed integral with these elements. Unlike the planks of the prior art, the planks of the present invention have ribs extending between the side edges of the plank and parallel to the normal direction of vehicular movement thereon, thereby to minimize bending or flexture of the ribs and increase the operational life of the matting.

It was surprisingly found that concentrated loading of the ribs at their mid-point can be prevented by reducing the radius of the fillets at the juncture of the ribs with the plates; the applied impact loads and resultant bending stresses being distributed over the surface of the ribs to minimize the threat of rupture and to facilitate greater axial movement of the ribs with respect to the plates.

Preferably, the radius of curvature of the fillet between the ribs and plates is no greater than the thickness of the ribs, more preferably from about 50 to 90% of the rib thickness. Although the thickness of the ribs and deck and base plates vary depending upon the load applied, these plates are preferably from about 0.06 to 0.125, more preferably from about 0.080 to 0.100 inch in thickness when constructed of a solution heat treated 6061 aluminum alloy. The alloy to be extruded is preferably aged to a T86 condition.

In tests of forwardly extruded mat sections of the prior art having ribs extending parallel to their longitudinal axis, the tensile strength of a mat extruded of 6061 aluminum alloy is from about 38,000 to 44,000 p.s.i., the yield strength being from about 35,000 to 40,000 p.s.i. In comparative tests with backwardly extruded mat sections produced according to the present invention from a solution heat treated billet, the yield strength of a sample taken in the direction of extrusion was unexpectedly found to be from about 50,000 to about 55,000 p.s.i. It can therefore be seen that the planks of the present invention are not only more durable, but are more suitable, because of their higher strength, for the construction of heavy duty aircraft runways.

The invention will be more fully understood from the following detailed description of the preferred embodiments illustrated in the drawings, in which:

FIG. 1 is a perspective view of an aircraft landing mat constructed from a plurality of the planks of the present invention;

FIG. 2 is an enlarged section taken along line 2—2 of FIG. 1, illustrating the manner in which adjacent planks are interconnected along their side edges;

FIG. 3 is an enlarged section of the mat taken along line 3—3 of FIG. 1, illustrating the manner in which adjacent planks are interconnected at their ends;

FIG. 4 is a perspective view, partially broken away, of the cellular plank of the present invention;

FIGS. 5–8 are end views, partially broken away, illustrating the various intermediate shapes resulting from the successive steps employed in forming the plank;

Figure 9:
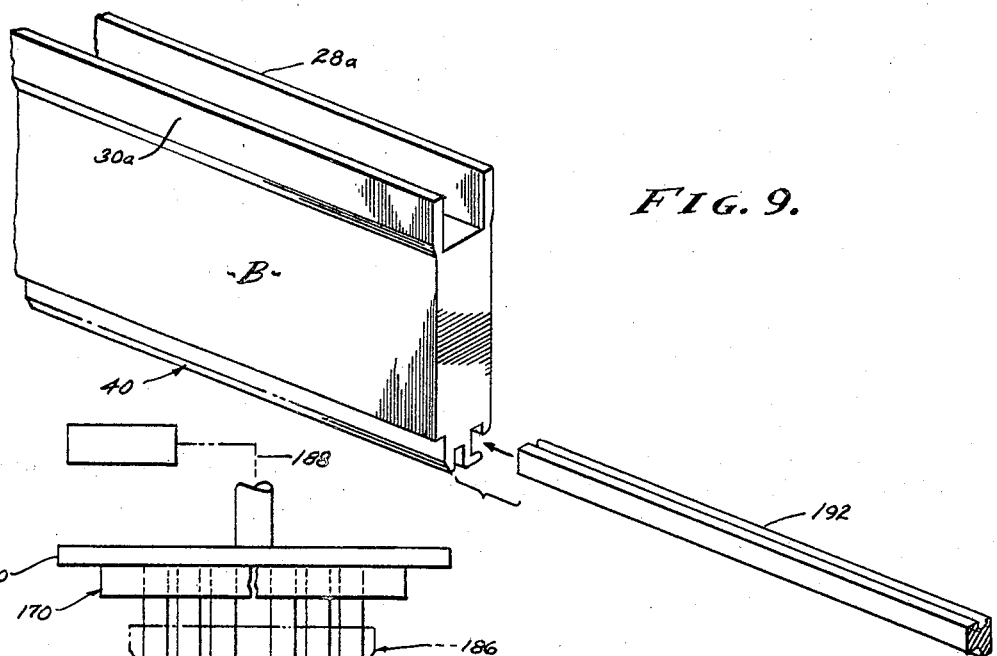
FIG. 9 is a fragmentary perspective view of a preshaped billet from which the plank is extruded.
Figure 10:
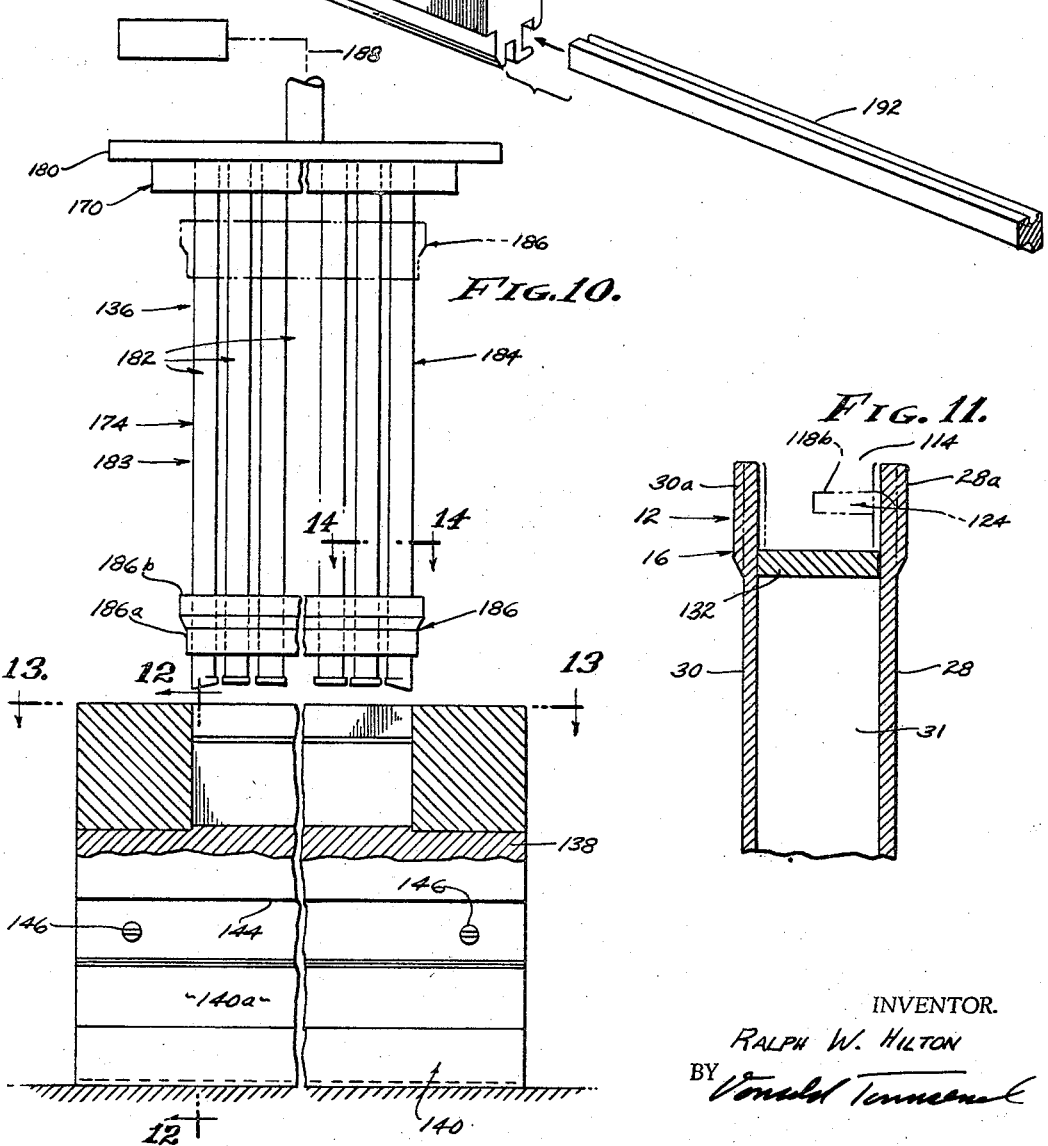
FIG. 10 is a side view, partially cut away, of the apparatus used in impact extruding the plank of FIG. 4.

With reference to the drawings, a modular load bearing platform indicated generally at 10 (FIG. 1) is assembled from a plurality of similar metal planks 12, 12a according to the present invention. A platform or landing mat can be constructed simply by interlocking adjacent planks 12, 12a at their ends and along their side edges. Preferably, each plank 12, 12a comprises a generally rectangular metal slab 16 having parallel longitudinal side edges 18 and parallel ends 20 (FIGS. 2 to 4).

Formed intermediate deck and base surfaces 24, 26, respectively, and extending between the side edges 18 normal to the longitudinal axis of the plank are a plurality of rectangular cells 22. These cells are formed by deck and base plates 28, 30, respectively; upstanding reinforcing ribs 31 extending between and integrally joined to walls 28, 30; and end walls 34, 36 closing the ends 20 of the plank. Edge wall 32 along one longitudinal side edge 18 of the plank closes one end of the cells 22, the other cell end of the extruded plank being open.

Along the side edges 18 of plank 16 are complementary side edge connector means 38 and 40, respectively, for releasably joining laterally adjacent planks 12 in side by side relation, the ends 20 of plank 16 also being provided with complementary end connecting means 42, 44 for releasably joining planks 12 in end-to-end relation.

In the extruded plank shown in FIGS. 5 to 7, the edge portions 28a, 30a of the upper and lower slab walls 28, 30, respectively, along the longitudinal side edge 18 extends beyond the open ends of the cells, the edge portion 28a of upper wall 28 being bent inwardly toward edge portion 30a of the lower wall 30 to form lip 28b. The wall edge portions 28a, 30a, and lip 28b comprise side edge connecting means 38 which interlocks with complementary side connecting means 40 formed on opposite longitudinal edge wall 32. Connecting means 40 comprises an upper, upwardly opening channel 40a and a lower, horizontally and downwardly opening recess 40b.

To interlock a pair of planks along their side edges, one plank is placed on the ground and the other is held in an inclined position, wherein the lip 28b on the ground supported plank, for example, engages in the channel 40a in the inclined plank. The inclined plank can then be rotated toward and into contact with the ground to the final position shown, wherein the lower edge portion 30a on one plank engages recess 40b in the other plank.

According to the present invention, end connecting means 42 and 44 are formed integral with end walls 34, 36, respectively, and have identical but inverted shapes in vertical section. Preferably, end connecting means 42 comprises upwardly opening channels 42a and 42b, upwardly extending lips 42c and 42d, at a horizontally opening slot 42e. Complementary end connecting means 44 comprises downwardly opening channels 44a and 44b, downwardly extending lips 44c and 44d at a horizontally opening slot 44e. A pair of such planks can thus be joined in end-to-end relation by interengaging end connecting means 42 on one plank with end connecting means 44 on the other plank and then sliding a bar or key 46 through the aligned slots 42e, 44e of the connecting means, see FIG. 3.

Utilizing the above described planks, a landing mat 10 can be constructed simply by interlocking the ends and side edges of adjacent planks. As shown in FIG. 1, the longitudinal side edges of the planks are arranged normal to the direction of landing aircraft A with planks in adjacent rows being staggered and planks 12a of half length being laid at the ends of alternate rows. Preferably, the side edges of the mat are held in place by anchoring means 14 which interengage adjacent end connecting means 42 or 44 on the adjacent plank ends. If desired, the end edges of the mat can be similarly anchored.

To prevent the entry and accumulation of soil and other debris into the mat interior, the open ends of the cells 22 are preferably closed by a wall member 48, such as a channel, which can be secured in position between the upper and lower wall edge portions 28a, 30a of the plank. In the illustrated plank configuration, for example, the wall member or channel 48 is held in place by shoulders 50 on the wall edge portions.

The planks of the present invention can be extruded from a billet as described in my copending application Ser. No. 469,935, filed Oct. 18, 1965, entitled "Method and Apparatus for Fabricating Cellular Load Bearing Planks Involving Impact Extrusion of Cylindrical Cellular Slabs." In this extrusion process, billet B of extrudable material, such as aluminum, is extruded to form extending wall portions 118, 120, and side connecting means 40 (see FIG. 9). Optionally, billet B can be extruded endwise to the desired shape. Thereafter, billet B is backwardly extruded to form slab 16 (FIG. 4) which comprises upper and lower walls 28 and 30, respectively; intervening alternate cells 22; reinforcing ribs 31; side connecting means 40; end connecting means 42, 44; and extending wall edge portions 118, 120 referred to above. To seal the open ended cells, wall member 48 is inserted between extending wall edge portions 118, 120, the edge portion 112 is bent to form the lip 118b, and edge portions 118, 120 are pressed inwardly to clamp the wall member 48 in place.

The apparatus used in backwardly extruding billet B includes an improved extrusion die 134 and an extrusion punch assembly 136 which cooperates therewith (FIGS. 10 to 15). Extrusion die 134 comprises a metal die bar 138 which is preferably of cylindrical shape and transverse cross section. The die bar is supported by a pair of metal supporting members or plates 140 which are substantially coextensive with and extend lengthwise of the die bar along opposite sides thereof. Each side of the die bar is milled or otherwise machined to form a longitudinally extending recess into which the upper edge portion of an adjacent supporting plate 140 is inserted. Each such plate receiving recess has a vertical side wall 142 against which seats the inner surface of the respective supporting plate and an upper, horizontal downwardly presented surface or shoulder 144. The supporting plate 140 can be rigidly secured to die bar 138, such as by screws 146.

The bottom 148 of supporting plates 140 are located in a common plane parallel to the longitudinal axis of die bar 138, the under surface of the die bar preferably being machined to form on the bar a flat face 150 disposed in a plane parallel to the common plane of the lower edge faces 148 of the supporting plates. The lower die bar face 150 is vertically spaced a distance $d$ above the common plane of the plate edge faces 148.

Formed in the upper surface of the die bar is a generally rectangular extrusion die cavity 152 having vertical side walls 154, vertical end walls 156, and a bottom wall 158. This cavity is preferably formed by machining a slot 160 of the desired width and depth from one end of the die bar to the other. Inserts 162 are then placed in the ends of slot 160 to form end walls 156. These inserts which are generally T-shaped in plan view have flat plate-like sections 164 which fit in keying relation in die bar slot 160 and transverse sections 166 at one end of the plate sections 164. The protruding ends of these insert transverse sections fit in cross slots 168 extending into the upper side of the die bar and opening into the die bar slot 160.

The extrusion punch assembly 136 comprises a punch mounting bar, a cross head 170 having vertical openings 172 extending therethrough. Extending through these openings and depending below the cross head are extrusion punches 174. The upper ends of the punches have external flanges 176 which engage internal shoulders 178 about the cross head openings 172 to restrain the punches against downward endwise movement relative to the cross head 170. A retaining plate 180 is bolted or otherwise secured to the upper surface of the cross head to restrain the punches against upward endwise movement relative to the cross head.

Uniformly spaced along the cross head 170 are punches 174 which include a set of intermediate punches 182 and two outer or end punches 183, 184. The intermediate punches 182 are identical, each punch having a rectangular shank 182a and a rectangular extrusion flange 182b on the lower end of the shank. Punches 182 are disposed with their confronting faces in parallel planes normal to the punch cross head 170. The outer punches 183, 184 have similar but reversed cross-sectional configurations complementing the cross-sectional configuration of the end connecting means 42, 44, respectively, on plank 12. The punch-receiving openings 172 in the cross head 170 are rectangular to restrain punches 174 against turning about their longitudinal axes.

Slidably mounted on punches 174 is a combined locator and stripper bar 186, the upper edge portion of the bar preferably being somewhat larger than the lower edge portion. This bar has rectangular openings slidably receiving the punch shanks. The lower edge portion 186a of the locator and stripper bar 186 is dimensioned to fit slidably in the upper end of the extrusion die cavity 152.

A drive means 188 moves punch assembly 136 and punches 174 into and out of extrusion die 134. The punch assembly is moveable toward the die to a position wherein the lower edge portion 186a of locator and stripper bar 186 fits in the upper end of extrusion die cavity 152 and the extrusion punches 174 extend into the cavity to a position such that the leading ends of the punches are spaced a predetermined distance from bottom wall 158 of the cavity. The locator and stripper bar 186 operates to locate the leading ends of the punches in accurately centered relation between the walls of the die cavity. The extrusion flanges 182b on the punches are narrower, by predetermined amount, than the die cavity so that an extrusion space or opening surrounds each punch.

In practice, extrusion die 134 rests on a suitable supporting surface S in proper vertical alignment with extrusion punch assembly 136. The billet B is then placed in the die cavity 152 with the connecting means 40 on the billet at the bottom of the die cavity. A suitable formation 190 on bottom wall 158 of the die cavity and a hard forming bar 192 inserted endwise into the undercut groove of the connecting means 40 cooperate to maintain the shape of the latter connecting means during extrusion.

As drive means 188 moves punches 174 downwardly into the die cavity 152, these punches penetrate the billet thereby forcing the billet material upwardly into the cavity between the punch and die walls. As the displaced billet material reaches the locator and stripper bar 186, the latter is elevated above the die cavity and upwardly along the punches. When the extrusion punches have descended to their lower limiting position in the die cavity, the punch assembly 136 is retracted from the cavity and the extruded material, which comprises the cellular slab 16, is removed.

Figure 11:
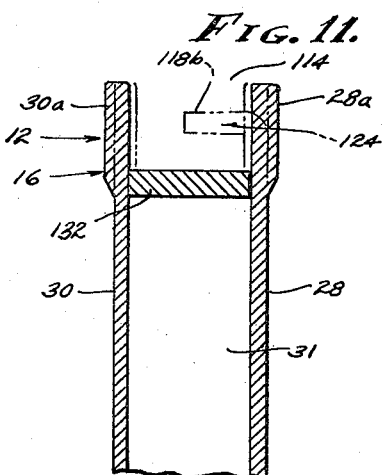
FIG. 11 is a sectional view taken along line 11—11 of FIG. 4, showing the wall used in closing the open ends of the slab cells and the final shape of the flange, in dotted lines, produced by bending the flange of the extruded mat.

Fabrication of the plank 12 is then completed by removing the forming bar 192, inserting wall member 48 between the extending edge portions 118, 120 of the extruded slab, pressing these edge portions inwardly toward one another, as indicated in FIG. 11, and bending the edge portion 118 to form lip 118b.

Figure 15:
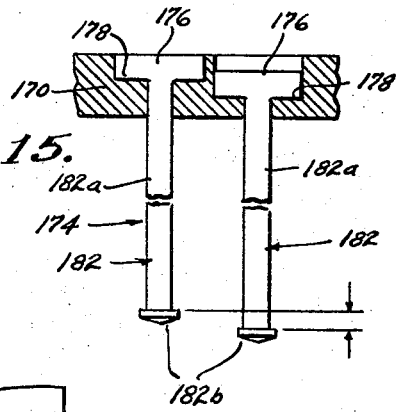
FIG. 15 is an enlarged fragmentary side elevation of the supporting structure for the extrusion punches, partially broken away to illustrate the manner in which alternate punches are permitted to float endwise to facilitate extraction of the punches from the extruded cellular slab.
Figure 13:
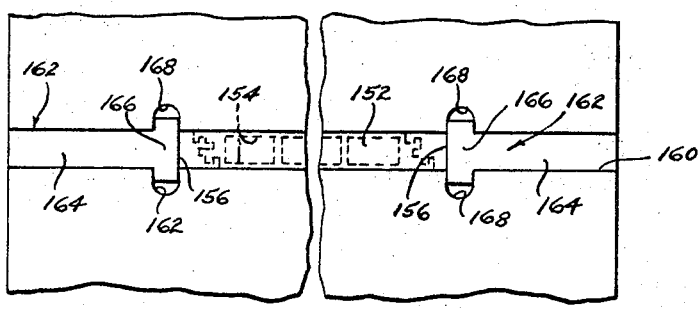
FIG. 13 is a fragmentary plan view of the extrusion die cavity taken along line 13—13 of FIG. 10.

To facilitate extraction of punches 174 from the extruded slab 16, alternate punch receiving openings 172 in cross head 170 are axially dimensioned to permit the punches to float a limited distance in the axial direction as shown in FIG. 15. When the punches are extracted from the extruded slab, the alternate punches drop down below the intervening punches to facilitate their removal from the slab.

To assist in affixing wall member 32 in position, extending wall portions 118, 120 of billet B project beyond the sides of the billet as shown in FIG. 9. When the edge portions are subsequently pressed inwardly to clamp wall member 48 into position, these edge portions are displaced inwardly with their outer surfaces flush with the outer surfaces of extruded slab 16. This inward displacement of the edge portions forces the latter over longitudinal edges of wall member 48 thereby securely locking the wall member in position.

In the extrusion, the flowing billet material, exerts an outward force against the walls of die cavity 152 which tends to separate side walls 154 and thereby increase the width of the cavity. In the prior art processes where greater separation occurs between the ends of the die cavity, the walls 28, 30 of the resultant extruded shape bow outwardly.

In the present process, however, extrusion die 134 resists separation during extrusion to produce a high quality extruded shape of the desired dimensions with flat walls 28 and 30.

Figure 12:
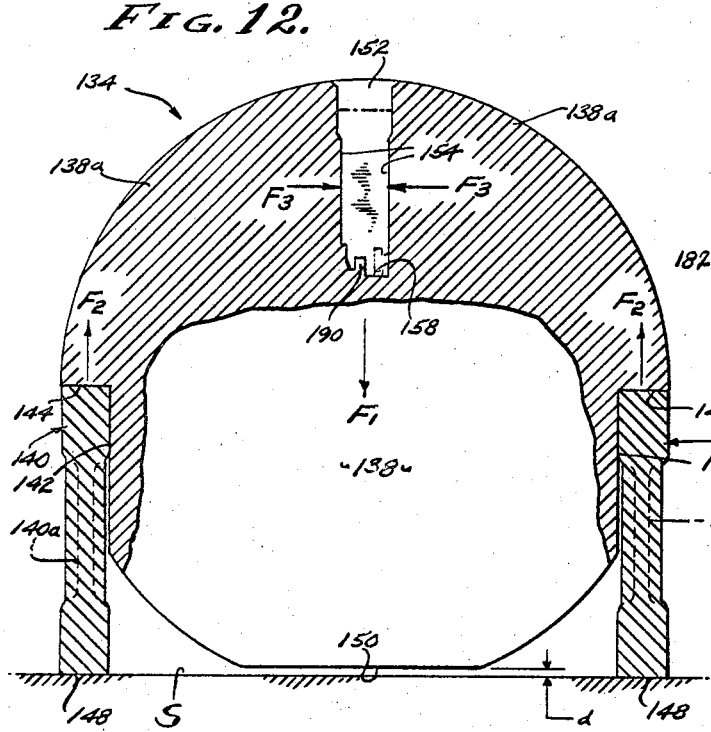
FIG. 12 is a vertical section through the extrusion die taken along line 12—12 of FIG. 10, showing the configuration of the die cavity.
Figure 14:
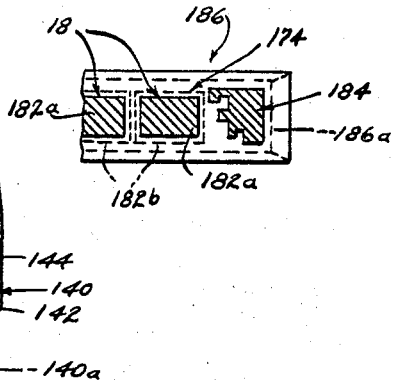
FIG. 14 is a horizontal section taken along line 14—14 of FIG. 10, showing the punch used in the extrusion apparatus.

As seen in FIG. 12, the descending extrusion punches 174 produce a downward force $F_1$ on extrusion die bar 138 in a vertical plane midway between the supporting plates 140. These supporting plates, in turn, produce upward vertical reaction forces $F_2$ on the die bar shoulders 144. Forces $F_1$ and $F_2$ produce generally horizontal, inwardly directed forces $F_3$ on the upper portions 138a of die bar 128, at opposite sides of cavity 152, in opposition to the outward forces exerted on the cavity side walls 154 by the extruded billet material. Forces $F_3$ thus prevents separation of the cavity side walls during the extrusion cycle. In practice, it has been unexpectedly found that the width of the extrusion die construction in accordance with the present invention remains constant during the entire extrusion cycle.

Since the magnitude of forces $F_3$ required to preserve the proper width of die cavity 152 over its length varies along the cavity, the resisting forces must be greatest midway between the ends of the cavity and diminish toward the ends of the cavity. The desired variations in forces $F_3$ along the die cavity 152 is achieved by milling or otherwise machining supporting plates 140 for the die bar 138 to provide the plates with web sections 140a which vary in effective thickness from one end of the supporting plates to the other. These web sections have a maximum thickness midway between the ends of the die cavity 152 where the greatest forces $F_3$ are required, the web sections tapering toward the ends of the die cavity where the smallest forces $F_3$ are required.

Since under some conditions forces $F_3$ on portions 38a of the die bar 138 becomes excessive and actually force the die cavity side walls 154 inwardly, the clearance dimension $d$ between the plane of the lower edge faces 148 of supporting plates 140 and the lower face 150 of die bar 138 is desirably selected to limit the resisting forces. In this manner, the die bar is caused to bottom on the supporting surface S at some predetermined vertical load on the die bar which gives rise to the maximum resisting forces $F_3$ permitted in a particular extrusion cycle. The improved die of the present invention can also be used to extrude other shaped objects.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, to be within the full range of equivalency of the following claims.

What I claim is:

1. An extrusion for use in forming a mat section and comprising: upper deck and lower base plates spaced by means of reinforcing ribs, said extrusion having ends and sides of greater length with integrally formed male and female connectors on opposite ends for end-to-end interlocking engagement with adjacent planks, said reinforcing ribs extending parallel to the end connectors and adapted to be placed longitudinally of the roadway, one side of the extrusion being in the form of an upper channel and the top wall of the other side of said extrusion extending beyond the ribs and being bent downwardly to form a lip adapted to be received by a channel at the side of an adjacent unit.

2. The mat section of claim 1, wherein a wall member is secured between the deck and base plates and crosswise of the ends of the ribs, whereby to close the open ends of the cells.

3. The mat section of claim 1, wherein a fillet formed at the juncture of the ribs with the plates has a radius of curvature no greater than the thickness of the ribs, whereby to permit axial movement of the ribs with respect to the plates.

4. The mat section of claim 3, wherein the fillet has a radius of curvature of from about 50 to 90% of the rib thickness.

5. A backwardly extruded aluminum mat section as defined by claim 1.

6. A matting of at least two end-to-end positioned mat sections as defined by claim 1, wherein the mat sections are arranged with a longitudinal side edge thereof generally normal to the direction of movement of a rolling load thereof.

7. A matting of at least two side-by-side positioned mat sections as defined by claim 1, wherein the mat sections are arranged with a longitudinal side edge thereof generally normal to the direction of movement of a rolling load thereon.

References Cited

UNITED STATES PATENTS

| | | | |
|---|---|---|---|
| 2,478,993 | 8/1949 | Wing | 94—13 X |
| 3,301,147 | 1/1967 | Clayton et al. | 94—13 |
| 3,319,543 | 5/1967 | Braeuninger et al. | 94—13 |

JACOB L. NACKENOFF, *Primary Examiner.*